US011325506B2

(12) United States Patent
Kanazawa

(10) Patent No.: US 11,325,506 B2
(45) Date of Patent: May 10, 2022

(54) BRAKE DEVICE FOR MOTOR VEHICLE SEAT

(71) Applicant: TF-METAL Co., Ltd., Kosai (JP)

(72) Inventor: Takaya Kanazawa, Kosai (JP)

(73) Assignee: TF-METAL CO., LTD., Kosai (JP)

( * ) Notice: Subject to any disclaimer, the term of this patent is extended or adjusted under 35 U.S.C. 154(b) by 108 days.

(21) Appl. No.: 16/536,435

(22) Filed: Aug. 9, 2019

(65) Prior Publication Data

US 2020/0086771 A1    Mar. 19, 2020

(30) Foreign Application Priority Data

Sep. 14, 2018 (JP) .............................. JP2018-172035

(51) Int. Cl.
*B60N 2/16* (2006.01)
*B60N 2/235* (2006.01)

(52) U.S. Cl.
CPC ........... *B60N 2/2362* (2015.04); *B60N 2/168* (2013.01); *B60N 2/1685* (2013.01)

(58) Field of Classification Search
CPC ...... B60N 2/168; B60N 2/167; B60N 2/1889; B60N 2/2254; B60N 2/2227; B60N 2/938; B60N 2/934; G05G 5/02
See application file for complete search history.

(56) References Cited

U.S. PATENT DOCUMENTS

| | | | | |
|---|---|---|---|---|
| 2003/0173182 A1* | 9/2003 | Kim | ........................ | B60N 2/168 192/223.2 |
| 2003/0222193 A1* | 12/2003 | Nemoto | ............... | B60N 2/1615 248/422 |
| 2007/0227854 A1* | 10/2007 | Cabrit | .................... | B60N 2/167 192/223.2 |
| 2009/0184554 A1 | 7/2009 | Paing et al. | | |
| 2009/0273218 A1* | 11/2009 | Park | ...................... | B60N 2/167 297/284.6 |

(Continued)

FOREIGN PATENT DOCUMENTS

| | | |
|---|---|---|
| EP | 3 330 123 A1 | 6/2018 |
| JP | 3977065 B2 | 9/2007 |

(Continued)

OTHER PUBLICATIONS

Extended European Search Report, Application No. 19195779.4, dated Feb. 24, 2020, 7 pages.

(Continued)

*Primary Examiner* — Kyle J. Walraed-Sullivan
(74) *Attorney, Agent, or Firm* — Foley & Lardner LLP

(57) ABSTRACT

A brake device for a motor vehicle seat is composed of a brake assembly, a tooth assembly, and a lever assembly. The brake assembly includes a housing, a pinion shaft, a braking component, and a drive wheel that are structured to be self-held in an assembled state by mechanical interaction thereamong. The tooth assembly includes a holder plate and a tooth plate that are structured to be self-held in an assembled state by mechanical interaction therebetween. The lever assembly includes an input lever, a cover, a coil spring, and a lever bracket that are structured to be self-held in an assembled state by mechanical interaction thereamong. The brake assembly, the tooth assembly, and the lever assembly are arranged and assembled together in an axial direction.

3 Claims, 14 Drawing Sheets

(56) References Cited

U.S. PATENT DOCUMENTS

| | | | |
|---|---|---|---|
| 2010/0139425 A1* | 6/2010 | Schulz | B60N 2/168 74/63 |
| 2010/0201174 A1* | 8/2010 | Ito | B60N 2/2252 297/362 |
| 2010/0219037 A1* | 9/2010 | Cai | B60N 2/168 192/223 |
| 2010/0308634 A1* | 12/2010 | Narita | B60N 2/0232 297/362 |
| 2011/0266851 A1* | 11/2011 | Kim | B60N 2/167 297/344.12 |
| 2012/0007402 A1* | 1/2012 | Stilleke | B60N 2/2252 297/362 |
| 2012/0267932 A1* | 10/2012 | Narita | B60N 2/2254 297/354.1 |
| 2012/0273319 A1* | 11/2012 | Hur | B60N 2/167 192/15 |
| 2013/0009439 A1* | 1/2013 | Jokiel | B60N 2/2254 297/362 |
| 2013/0207434 A1* | 8/2013 | Stilleke | B60N 2/2252 297/362 |
| 2013/0214579 A1* | 8/2013 | Jokiel | B60N 2/2252 297/362 |
| 2015/0096859 A1* | 4/2015 | Isoda | F16D 41/18 192/15 |
| 2015/0266397 A1* | 9/2015 | Benjamin | F16D 41/105 192/15 |
| 2015/0314709 A1* | 11/2015 | Kim | B60N 2/1864 297/344.12 |
| 2016/0229315 A1* | 8/2016 | Yamada | B60N 2/06 |
| 2016/0280099 A1* | 9/2016 | Kaku | F16D 51/12 |
| 2016/0375801 A1* | 12/2016 | Ikeda | B60N 2/1615 74/89.18 |
| 2017/0088018 A1* | 3/2017 | Suzuki | B60N 2/167 |
| 2017/0240069 A1* | 8/2017 | Asai | B60N 2/167 |
| 2017/0253148 A1* | 9/2017 | Chae | B60N 2/169 |
| 2018/0141469 A1* | 5/2018 | Suzuki | B60N 2/167 |
| 2018/0147957 A1* | 5/2018 | Kanazawa | B60N 2/2227 |
| 2018/0162238 A1* | 6/2018 | Benjamin | B60N 2/167 |
| 2019/0032728 A1* | 1/2019 | Sato | F16D 59/00 |
| 2019/0047444 A1* | 2/2019 | Sato | F16D 41/10 |
| 2019/0210489 A1* | 7/2019 | Sato | A47C 7/02 |
| 2019/0225121 A1* | 7/2019 | Chiang | B60N 2/682 |
| 2020/0086777 A1* | 3/2020 | Kanazawa | B60N 2/2254 |
| 2020/0096057 A1* | 3/2020 | Mikasa | B60N 2/1615 |
| 2020/0171984 A1* | 6/2020 | Kajino | B60N 2/167 |
| 2020/0282872 A1* | 9/2020 | Ng | F16D 67/02 |
| 2020/0398706 A1* | 12/2020 | Suzuki | F16H 51/00 |

FOREIGN PATENT DOCUMENTS

| | | | | |
|---|---|---|---|---|
| JP | 2018-086976 A | | 6/2018 | |
| JP | 2018-090238 A | | 6/2018 | |
| WO | WO-2016059875 A1 * | | 4/2016 | G05G 5/18 |

OTHER PUBLICATIONS

U.S. Appl. No. 16/536,445, filed Aug. 9, 2019, TF-Metal Co., Ltd.
Japanese Office Action and English translation, Application No. 2018-172035, dated Mar. 29, 2022, 5 pages.

* cited by examiner

BRAKE DEVICE FOR MOTOR VEHICLE SEAT

BACKGROUND

The present invention relates generally to a brake device for a motor vehicle seat, and particularly to a brake device for a motor vehicle seat which is mounted in a seat lifter mechanism or a seat recliner mechanism, wherein the seat lifter mechanism is structured to adjust a height position of a seat base of the motor vehicle seat, and the seat recliner mechanism is structured to adjust an angular position of a seat back of the motor vehicle seat.

Japanese Patent Application Publication No. 2018-086976 (JP 2018-086976 A) discloses a brake device for a motor vehicle seat, which is mounted in a seat lifter mechanism or seat recliner mechanism, and includes a brake mechanism section and a drive mechanism section. The brake mechanism section holds an output shaft braked, so as to prevent the output shaft from being rotated by a torque inversely inputted through a driving gear at a tip of the output shaft. When an operation member is rotated in a normal rotational direction or in a reverse rotational direction from its neutral position, the drive mechanism section releases the output shaft from the braked state, and allows the output shaft to be rotated by the rotation of the operation member. In the brake device, components of the brake mechanism section and components of the drive mechanism section are arranged coaxially.

SUMMARY

It is desirable to enhance facility of overall assembling of the brake device described above.

According to one or more embodiments, a brake device for a motor vehicle seat, includes: a brake assembly including a housing, a pinion shaft, a braking component, and a drive wheel that are structured to be self-held in an assembled state by mechanical interaction thereamong; a tooth assembly including a holder plate and a tooth plate that are structured to be self-held in an assembled state by mechanical interaction therebetween; and a lever assembly including an input lever, a cover, a coil spring, and a lever bracket that are structured to be self-held in an assembled state by mechanical interaction thereamong, wherein the brake assembly, the tooth assembly, and the lever assembly are arranged and assembled together in an axial direction; wherein: the brake assembly is structured as a braking section to resist an external torque inputted through the pinion shaft; the tooth assembly and the lever assembly are structured as an operating section to operate the pinion shaft; the pinion shaft extends through the drive wheel, the holder plate, and the input lever, and is supported rotatably with respect to the holder plate and the input lever; the braking component and the drive wheel are mounted in the housing; the drive wheel is structured to rotate along with the pinion shaft, and includes an internal tooth part; the holder plate is structured to frictionally resist rotation of the drive wheel, and includes a first support part; the tooth plate is rotatably supported by the first support part of the holder plate, and includes a pair of external tooth parts each of which is structured to engage with the internal tooth part of the drive wheel; the input lever includes a second support part structured to engage with the tooth plate, wherein the second support part is offset from the first support part of the holder plate; the cover is coupled with the housing to contain the holder plate, the tooth plate, and the input lever; the coil spring is structured to bias the input lever toward a neutral position; and the lever bracket is disposed outside the cover, and coupled with the input lever.

The brake device may be configured such that the holder plate includes a holding part structured to prevent the tooth plate from being released from the first support part. The brake device may be configured such that: the holder plate is implemented by a leaf spring; the holder plate includes: a pair of the holding parts extending along a first surface of the tooth plate facing the input lever; and an arm extending along a second surface of the tooth plate opposite to the first second surface; and the tooth plate is interposed and supported between the arm and the pair of holding parts. The brake device may be configured such that: the holder plate includes: a pair of legs structured to be pressed onto the drive wheel; and a pair of acting parts structured to engage with the cover; and the holder plate is structured to be held in a neutral position by the pair of acting parts when the input lever is in the neutral position. The brake device may be configured such that: the coil spring is interposed between the cover and the lever bracket, and mounted in a recess of the lever bracket; the coil spring includes a pair of ends engaged with a cut and raised part of the cover and a cut and raised part of the lever bracket; and the cut and raised part of the cover overlaps with the cut and raised part of the lever bracket when the lever bracket is in a neutral position.

DETAILED DESCRIPTION

Figure 1:
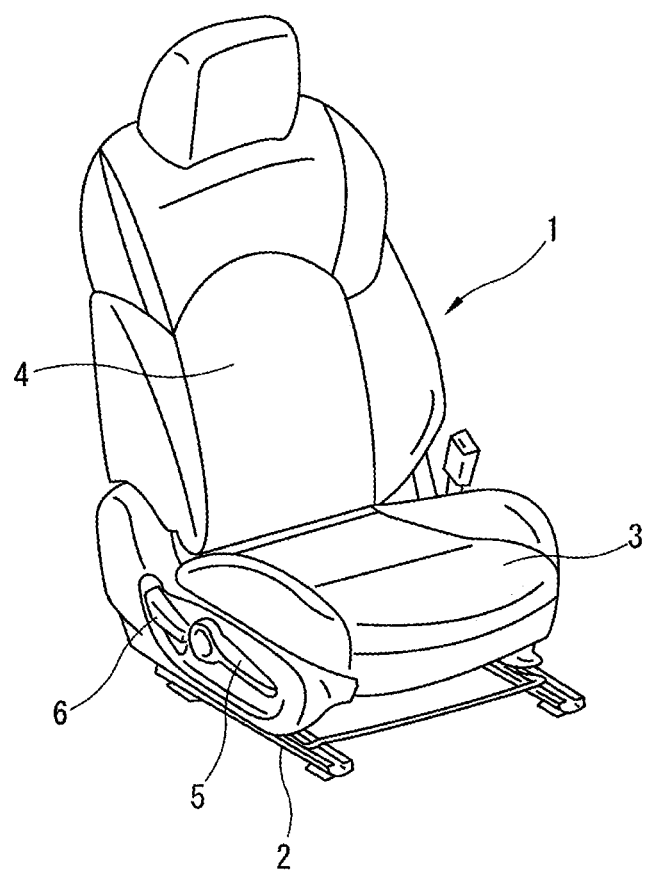
FIG. 1 is a perspective view of a motor vehicle seat provided with a seat lifter mechanism and a seat recliner mechanism as seat adjusters, according to a first embodiment.

FIG. 1 shows a motor vehicle seat provided with seat adjusters, according to a first embodiment. As shown in FIG. 1, a seat 1 is provided with a seat slide mechanism 2, a seat lifter mechanism, and a seat recliner mechanism as seat adjusters. The seat slide mechanism 2 is structured to adjust a fore-and-aft position of the seat 1. The seat lifter mechanism is structured to adjust a height position of a seat cushion 3 as a seat base of the seat 1. The seat recliner mechanism is structured to adjust an angular position of a seat back 4 of the seat 1. At a side part of the seat cushion 3, an operation lever 5 and an operation lever 6 are arranged for operation of the seat lifter mechanism and operation of the seat recliner mechanism, respectively.

With regard to the seat lifter mechanism, as the operation lever 5 is raised from a neutral position (the seat lifter mechanism is in a neutral state, when the operation lever 5 is in the neutral position) and released to the neutral position repeatedly, the height position of the seat cushion 3 is raised little by little. Conversely, as the operation lever 5 is lowered from the neutral position and released to the neutral position repeatedly, the height position of the seat cushion 3 is lowered little by little. In this way, the seat lifter mechanism serves a height position adjusting function for the seat base of the seat 1.

Figure 2:
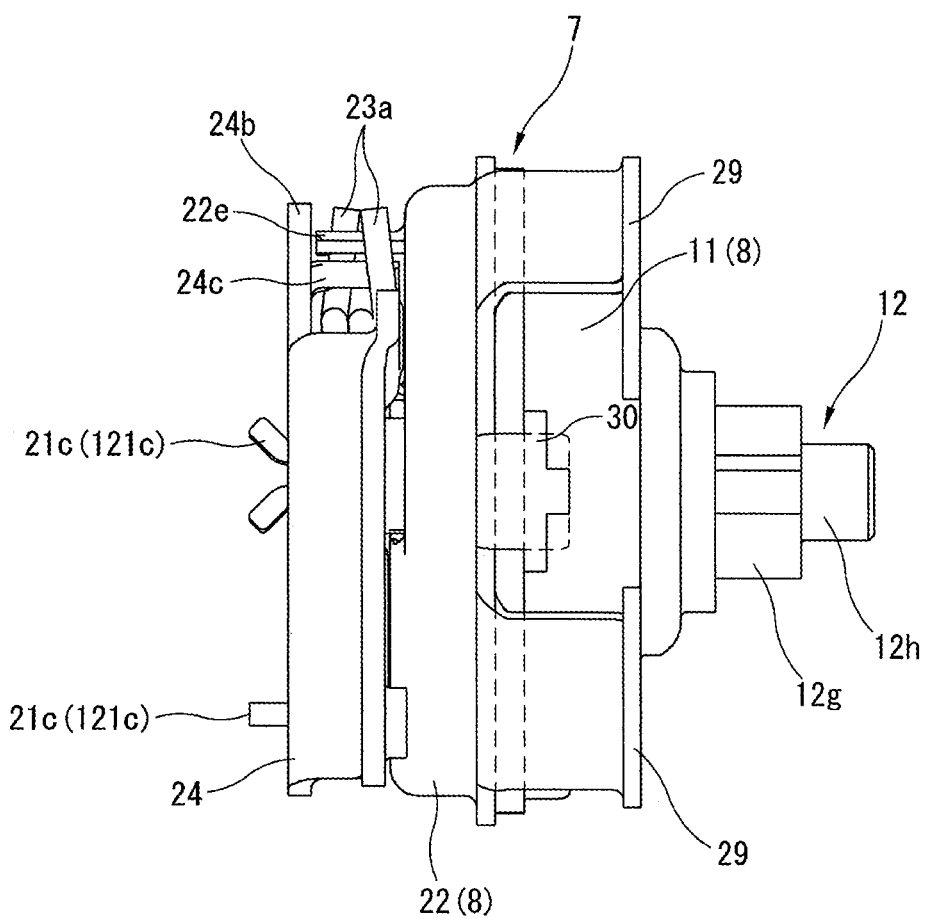
FIG. 2 is a front view of a brake device employed by the seat lifter mechanism shown in FIG. 1 as viewed from a front side of a motor vehicle when the motor vehicle seat is mounted in the motor vehicle, according to the first embodiment.
Figure 3:
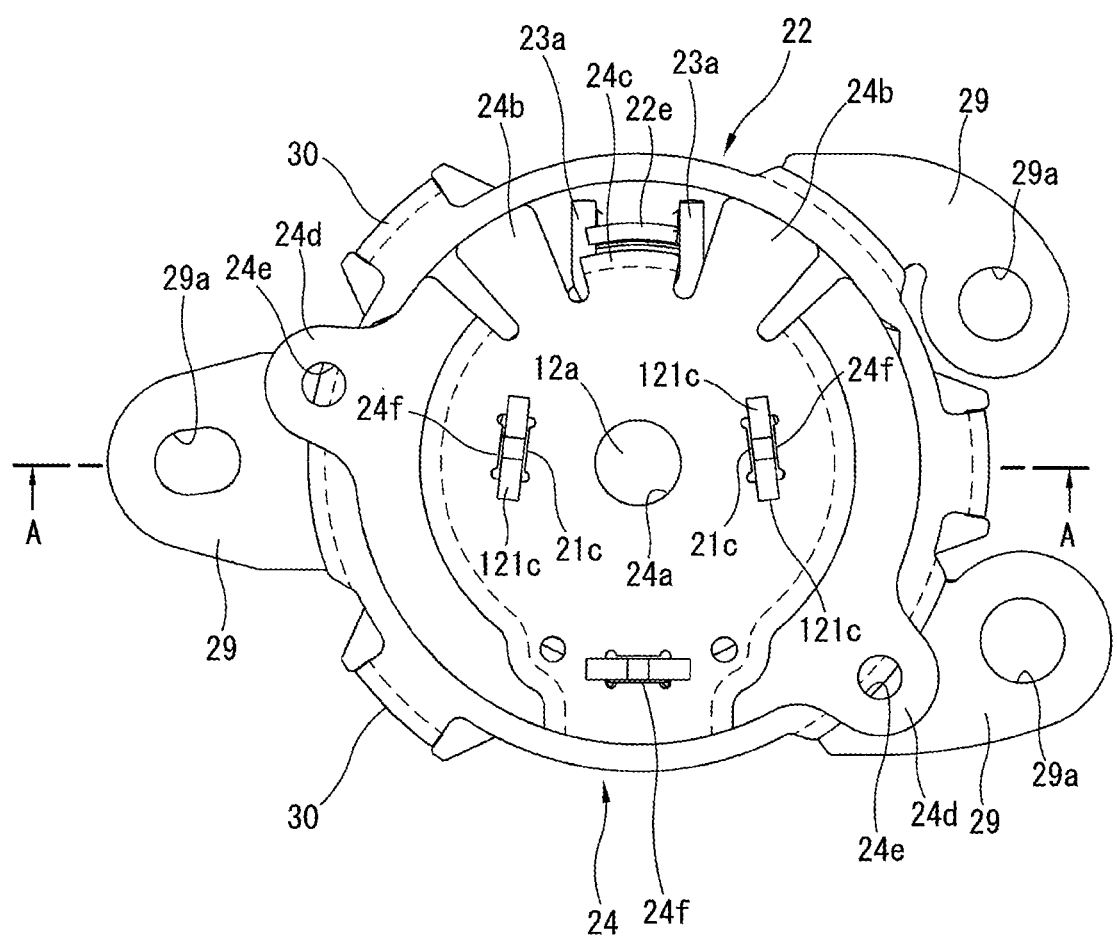
FIG. 3 is a left side view of the brake device shown in FIG. 2.
Figure 4:
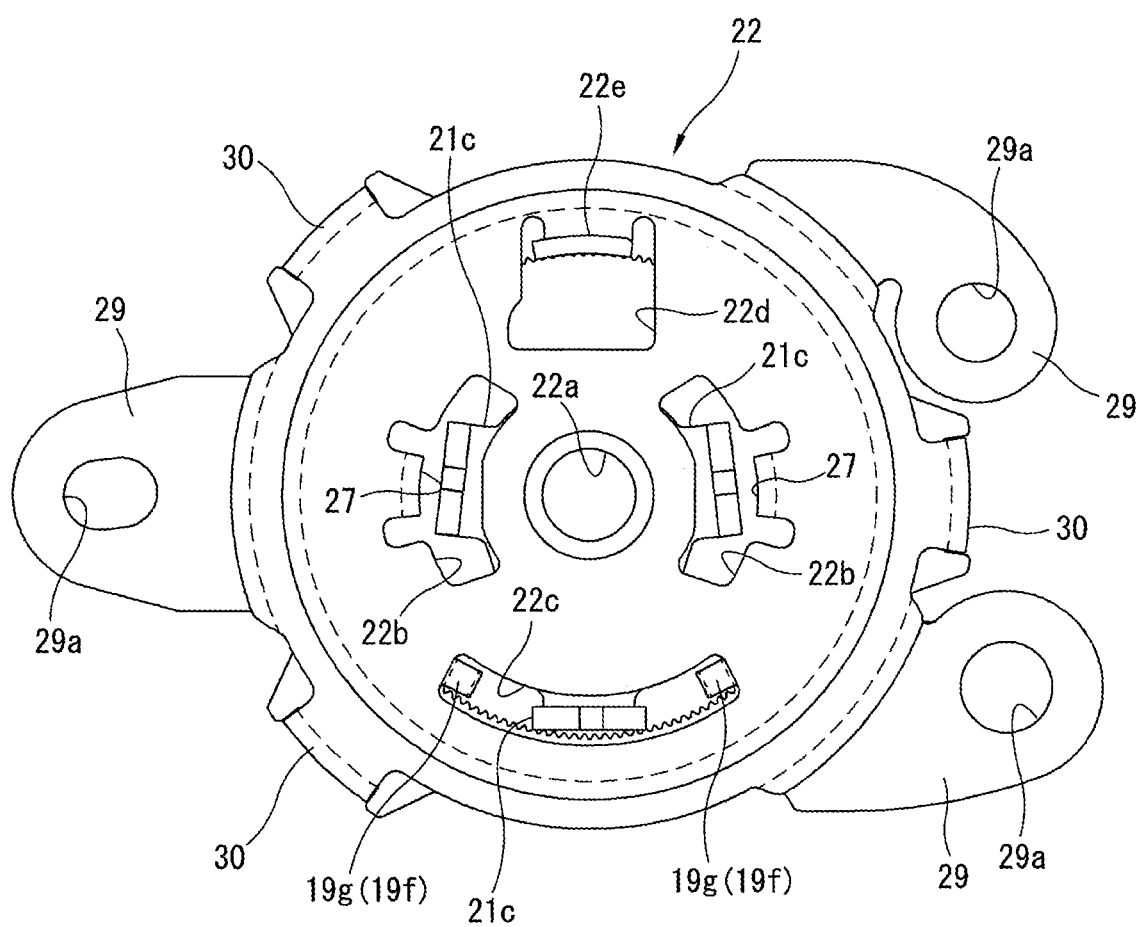
FIG. 4 is a left side view of the brake device shown in FIG. 3 as a lever bracket is removed from the brake device.
Figure 5:
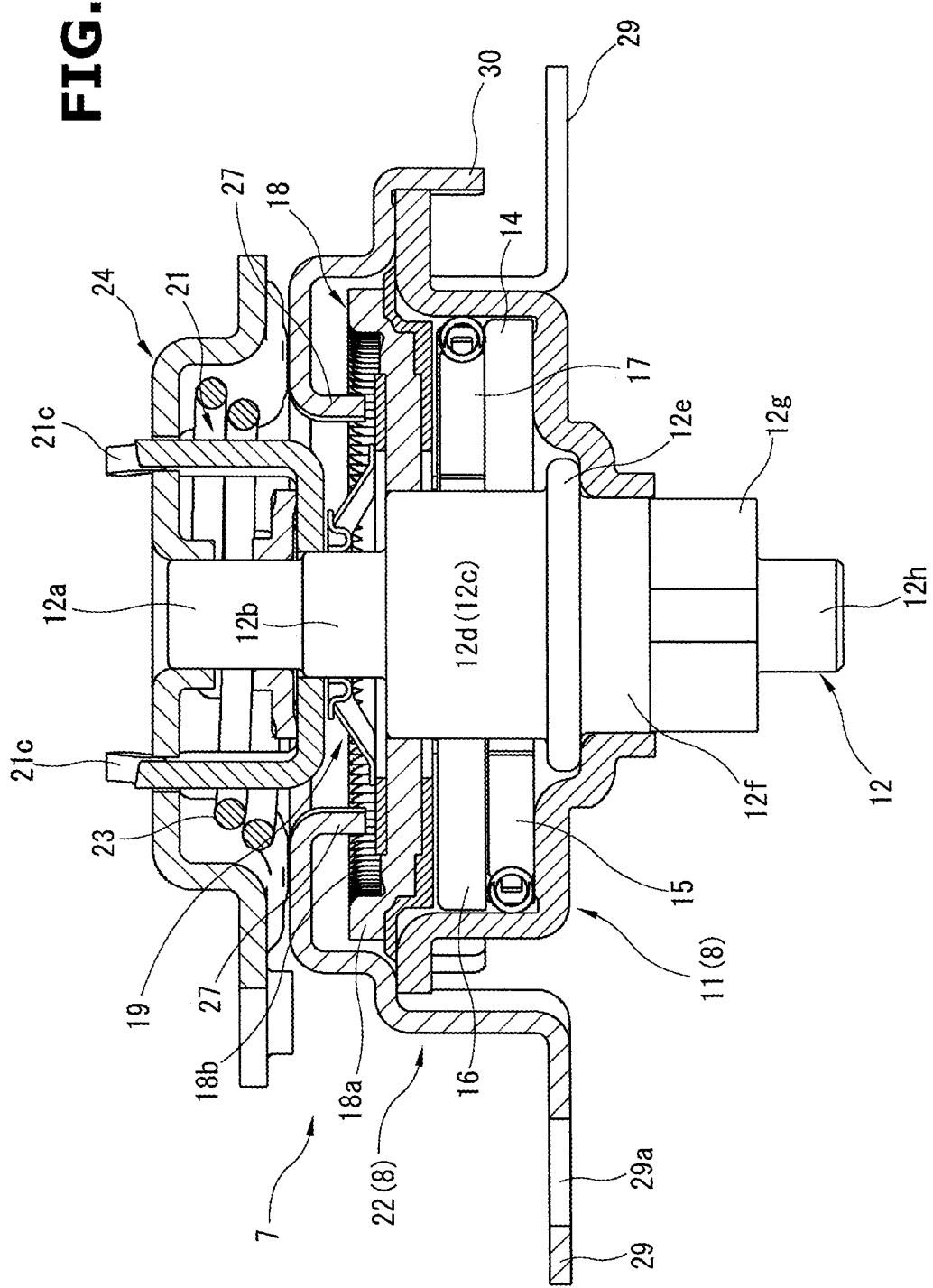
FIG. 5 is a sectional view of the brake device taken along a plane indicated by a line A-A in FIG. 3.
Figure 6:
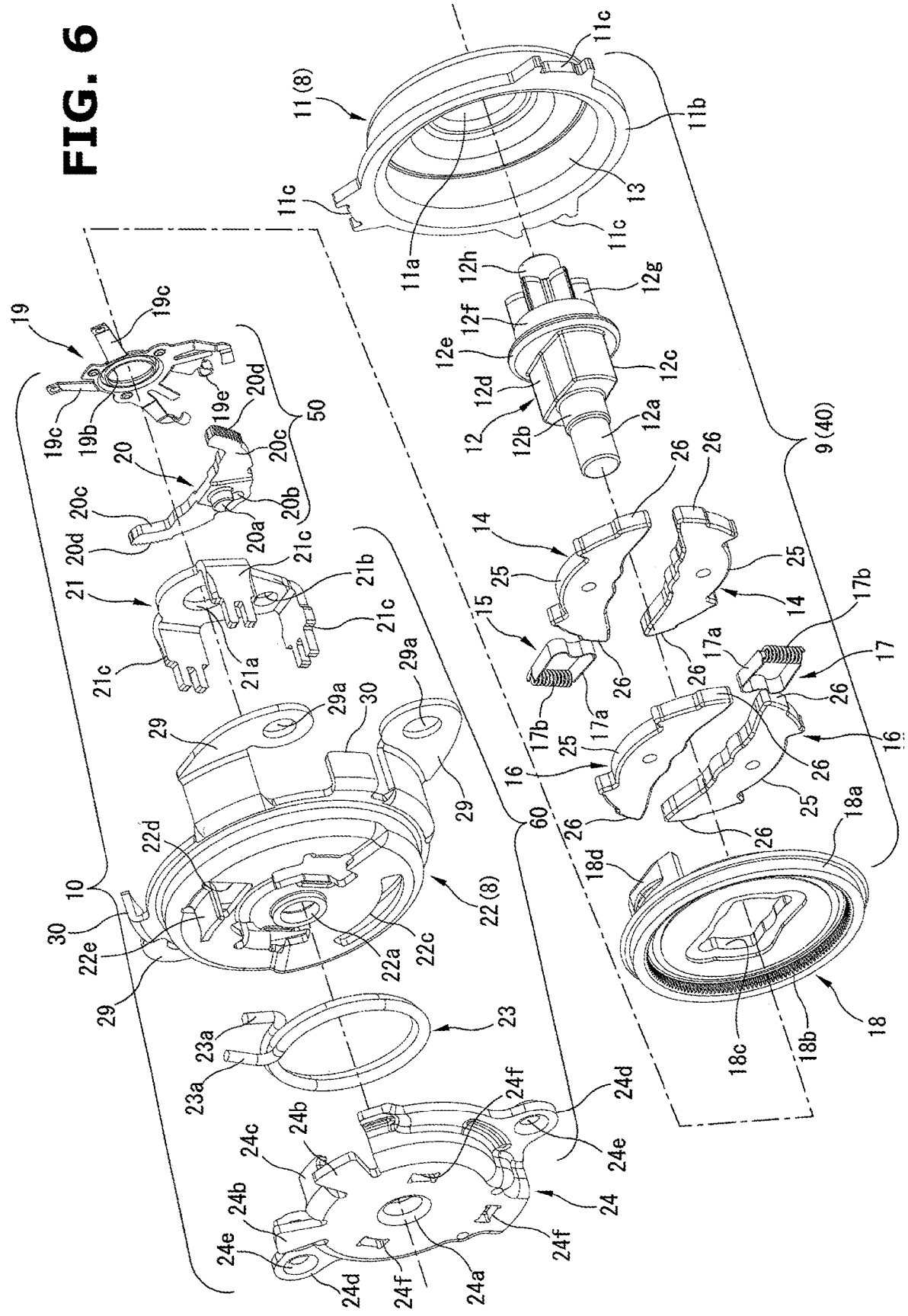
FIG. 6 is an exploded perspective view of components of a braking section and components of an operating section of the brake device shown in FIG. 2.

FIG. 2 shows a front view of a brake device 7 employed by the seat lifter mechanism of the seat 1 as viewed from a front side of a motor vehicle when the seat 1 is mounted in the motor vehicle. FIG. 3 shows a left side view of the brake device 7 shown in FIG. 2. FIG. 4 shows a left side view of the brake device 7 shown in FIG. 3 as a lever bracket 24 is removed from the brake device 7. FIG. 5 shows a sectional view of the brake device 7 taken along a plane indicated by a line A-A in FIG. 3. FIG. 6 shows an exploded perspective view of the brake device 7 shown in FIG. 2.

As shown in FIGS. 2 and 6, the brake device 7 is composed of a braking section 9 and an operating section 10. The brake device 7 includes a case 8 having a substantially cylindrical shape. The case 8 is composed of half-split housing members, namely, a housing 11 and a cover 22, which are abutted and coupled to each other. In the case 8, components of the braking section 9 and components of the operating section 10 are mounted and arranged coaxially as shown in FIG. 6. In a central position of the case 8, a pinion shaft 12 is supported to extend in an axial direction inside the housing 11 of the braking section 9 and also inside the cover 22 of the operating section 10. The pinion shaft 12 includes a first end rotatably supported by the lever bracket 24, and a second end formed integrally with a pinion gear 12g exposed externally to the outside. The lever bracket 24 and the operation lever 5 shown in FIG. 1 constitute an operation member.

The lever bracket 24 is structured to be rotated in a normal rotational direction or in a reverse rotational direction from its neutral position. The operation lever 5 shown in FIG. 1 is fixed to the lever bracket 24 by screwing with screw holes 24e (see FIG. 3) of the lever bracket 24.

The brake device 7 is mounted to a side bracket not shown of the seat 1 shown in FIG. 1 by mounting holes 29a of flanges 29 of the cover 22 such that the pinion gear 12g meshes with a driven gear not shown of the seat lifter mechanism.

When the lever bracket 24 is in the neutral position, the brake device 7 holds a braked state to prevent the pinion shaft 12 from being rotated by a torque inversely inputted through the pinion shaft 12. On the other hand, when the lever bracket 24 is rotated in the normal rotational direction or in the reverse rotational direction from the neutral position, the brake device 7 releases the pinion shaft 12 from the braked state, and allows the pinion shaft 12 to be rotated by rotating operation of the lever bracket 24. Rotation of the pinion shaft 12 is converted into a rotational displacement of the driven gear of the seat lifter mechanism through the pinion gear 12g, and further into a vertical displacement of the seat cushion 3 of the seat 1 via a link mechanism.

In general, the lever bracket 24 has a relatively short stroke. Accordingly, in many situations, in order to obtain a desired movement of the seat cushion 3, a process of rotating operation of the lever bracket 24 in a specific rotational direction and release of the lever bracket 24 is repeated.

As shown in FIGS. 2 and 6, in the case 8, which is composed of the housing 11 of the braking section 9 and the cover 22 of the operating section 10, some components of the braking section 9 and the operating section 10 are arranged coaxially and adjacent to each other. The following describes a three-dimensional shape and arrangement of each component with reference to FIG. 6 and others.

As shown in FIG. 6, the braking section 9 includes the housing 11, the pinion shaft 12, a pair of lock plates 14, a lock spring 15, a pair of lock plates 16, a lock spring 17, and a drive wheel 18. The housing 11 is a part of the case 8 as described above. The pinion shaft 12 is rotatably supported by the housing 11. Each lock plate 14 is mounted in the housing 11, and arranged opposite to each other, and has a substantially semicircular shape. The lock spring 15 is shared by the lock plates 14. The pair of lock plates 16 are placed over the lock plates 14 in the axial direction, and identical in shape to the lock plates 14. The lock spring 17 is shared by the lock plates 16. The drive wheel 18 is placed over the lock plates 16, and has a pan-like shape.

On the other hand, as shown in FIG. 6, the operating section 10 includes a holder plate 19, a tooth plate 20, an input lever 21, a cover 22, a coil spring 23, and the lever bracket 24. The holder plate 19 is placed over the drive wheel 18. The tooth plate 20 is combined with the holder plate 19. The input lever 21 is placed over the holder plate 19 and the tooth plate 20 in the axial direction. The cover 22 is abutted and coupled to the housing 11 to form the case 8 as described above. The coil spring 23 is a torsion coil spring arranged outside the cover 22. The lever bracket 24 is placed also outside of the cover 22, forming the operation member.

The housing 11 of the braking section 9 is made of a plate metal material having a specific thickness, and formed by drawing press into a pot-like shape, having a cylindrical inner peripheral surface serving as a braking surface 13.

The housing 11 includes a bottom part including a shaft hole 11a in which a larger-diameter shaft part 12f of the pinion shaft 12 adjacent to the pinion gear 12g is inserted. The housing 11 includes an opening edge part including a flange 11b. The flange 11b includes three engagement recesses 11c in this example. The three engagement recesses 11c are employed for coupling with the cover 22 as detailed below.

As shown in FIG. 6, the pinion shaft 12 has a multiple-stepped shape, including a smaller-diameter shaft part 12a, an intermediate-diameter shaft part 12b, a variant shaft part 12c, a flange 12e, the larger-diameter shaft part 12f, the pinion gear 12g, and a tip shaft part 12h, which are arranged coaxially and integrally formed. The variant shaft part 12c has a substantially rectangular shape, and includes a flat portion 12d. As shown in FIG. 5, the flange 12e is structured to abut an inner bottom surface of the housing 11, and thereby restrict movement of the pinion shaft 12 in the axial direction. The larger-diameter shaft part 12f is rotatably supported by the shaft hole 11a of the housing 11. The pinion gear 12g serves as a driving gear. The tip shaft part 12h is on the tip side of the pinion gear 12g. The flat portion 12d of the variant shaft part 12c of the pinion shaft 12 serves as an acting part to apply forces to the lock plates 14 and the lock plates 16.

As shown in FIG. 6, the lock plates 14 are structured to be in sliding contact with the inner bottom surface of the housing 11, and arranged opposite to each other, i.e. symmetric with respect to a line such as a vertical line or horizontal line. The lock plates 16 are placed over the lock plates 14 in the axial direction. Similar to the lock plates 14, the lock plates 16 are arranged opposite to each other, i.e. symmetric with respect to a line such as a vertical line or horizontal line. Each lock plate 14, 16 includes first and second ends between which a recess 25 is formed in its outer peripheral surface, wherein each of the first and second ends includes a braking and locking surface 26 that has a circular arc shape, and is structured to be in contact with the braking surface 13 of the housing 11.

The lock spring 15 is interposed in compressed state between the first end of the first lock plate 14 and the first end of the second lock plate 14, to bias the first end of each lock plate 14 away from each other. Similarly, the lock spring 17 is interposed in compressed state between the second end of the first lock plate 16 and the second end of the second lock plate 16, to bias the second end of each lock plate 16 away from each other. Each lock spring 15, 17 is a combined spring, including a leaf spring 17a and a coil spring 17b, wherein the leaf spring 17a is bended in an M-shape, and the coil spring 17b is interposed between ends of leg portions of the leaf spring 17a, to bias each leg portion of the leaf spring 17a away from each other.

As shown in FIG. 6, the drive wheel 18 is of an internal tooth type, including a ring part 18a at its outer periphery, and internal teeth 18b extending entirely in an inner periphery of the ring part 18a. The drive wheel 18 includes a rectangular hole 18c at its central position, wherein the variant shaft part 12c of the pinion shaft 12 is fitted in the rectangular hole 18c to allow the drive wheel 18 to rotate together with the variant shaft part 12c of the pinion shaft 12. The drive wheel 18 includes a pair of release nails 18d at its back side, wherein each release nail 18d projects toward the lock plates 14, 16, and has a circular arc shape as viewed in the axial direction (see FIG. 7).

The fitting between the rectangular hole 18c of the drive wheel 18 and the variant shaft part 12c of the pinion shaft 12 is provided with a preset play in the rotational direction. The drive wheel 18 is produced by forming the ring part 18a along with the internal teeth 18b by half blanking by stamping a circular metal plate (see FIG. 5), and then forming the release nails 18d and a bottom part inside the ring part 18a of a resin material by insert molding or the like.

As shown in FIGS. 6 and 5, the larger-diameter shaft part 12f of the pinion shaft 12 is inserted in and rotatably supported by the shaft hole 11a of the housing 11, wherein the larger-diameter shaft part 12f is formed at a root portion of the pinion gear 12g. On the other hand, the flat portion 12d of the variant shaft part 12c is inserted in an intermediate space between the lock plates 14 and an intermediate space between the lock plates 16. The variant shaft part 12c is loosely fitted in the rectangular hole 18c of the drive wheel 18 such that the variant shaft part 12c can rotate by a small angle with respect to the rectangular hole 18c.

Figure 7:
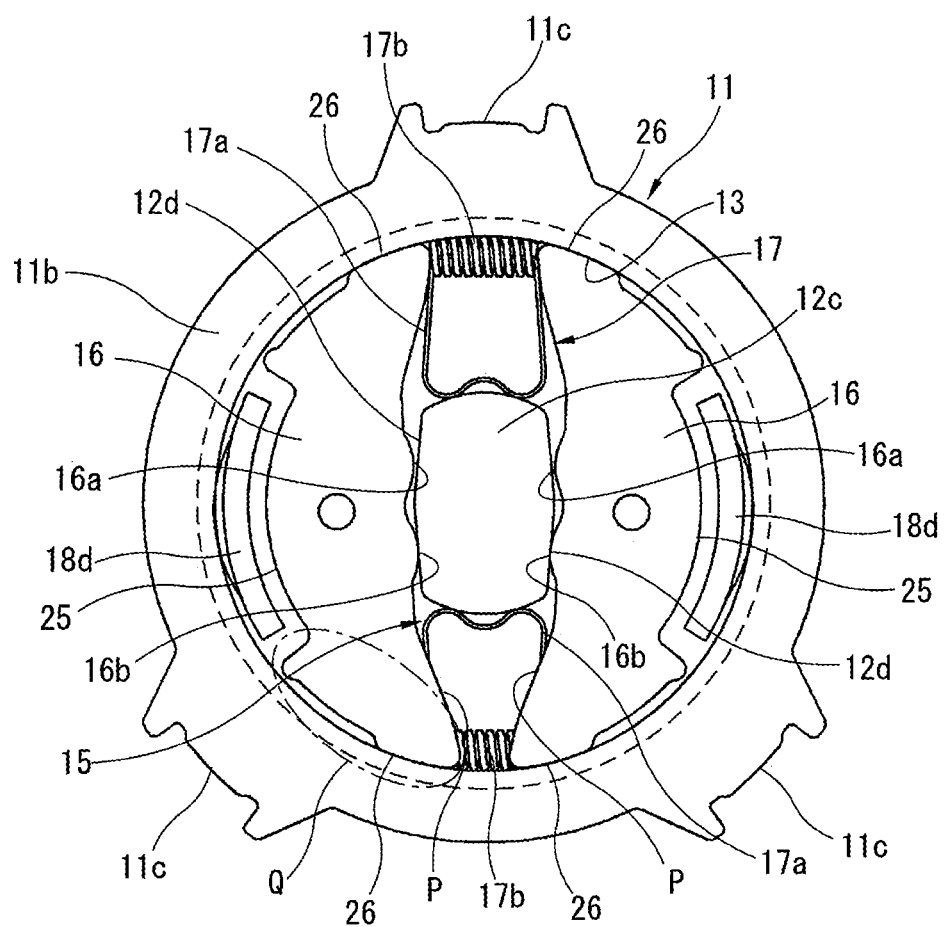
FIG. 7 is an illustrative view of the braking section shown in FIG. 6 when in its neutral state.

As shown also in FIG. 7, each of the release nails 18d of the drive wheel 18 is placed radially outside the corresponding lock plate 14 and the corresponding lock plate 16, and fitted in the recess 25 of the corresponding lock plate 14 and the recess 25 of the corresponding lock plate 16 with a clearance in the rotational direction. Each release nail 18d has an arc-shaped outer peripheral surface in pressing contact with the braking surface 13 of the housing 11 by an elastic force of the release nail 18d itself.

Specifically, as shown in FIG. 7, which shows the braking section 9 in the neutral state, each of the lock plates 16 sandwiching the variant shaft part 12c of the pinion shaft 12 has an end surface P that faces the flat portion 12d of the variant shaft part 12c, and includes protrusions 16a, 16b each having a circular arc shape. The protrusion 16a is located at the second end side of the lock plate 16, whereas the protrusion 16b is located at the first end side of the lock plate 16. The lock spring 17, which is disposed in compressed state between the second end of the first lock plate 16 and the second end of the second lock plate 16, biases them away from each other.

This causes each lock plate 16 to rotate along the braking surface 13 of the housing 11 by a preset amount such that the clearance between the first ends of the lock plates 16 is smaller than the clearance between the second ends of the lock plates 16. Accordingly, the protrusion 16b of each lock plate 16 is in contact with a corresponding portion of the flat portion 12d of the variant shaft part 12c, whereas the protrusion 16a is out of contact with the flat portion 12d of the variant shaft part 12c.

The foregoing positional relationship is true for the lock plates 14, except for the position of the lock spring. Namely, the lock spring 15, which is disposed between the first ends of the lock plates 14, biases the first ends of the lock plates 14 away from each other. Accordingly, the flat portion 12d of the variant shaft part 12c is in contact with the lock plates 14, 16 with no play in the rotational direction, wherein the variant shaft part 12c serves as an acting part as described below.

In FIG. 7 and the following, the orientation of the braking section 9 and the orientation of the operating section 10 are set different by 90 degrees from the positions shown in FIG. 6. As viewed in FIG. 7, the flat portion 12d of the pinion shaft 12 has a shape tapered from its center toward its upper end and toward its lower end in the vertical direction, including first and second generally flat surfaces generally parallel to each other, wherein each generally flat surface has an apex at its central position and is inclined from the apex toward the vertical ends. However, the flat portion 12d may be formed to have flat surfaces without inclination.

Figure 8:
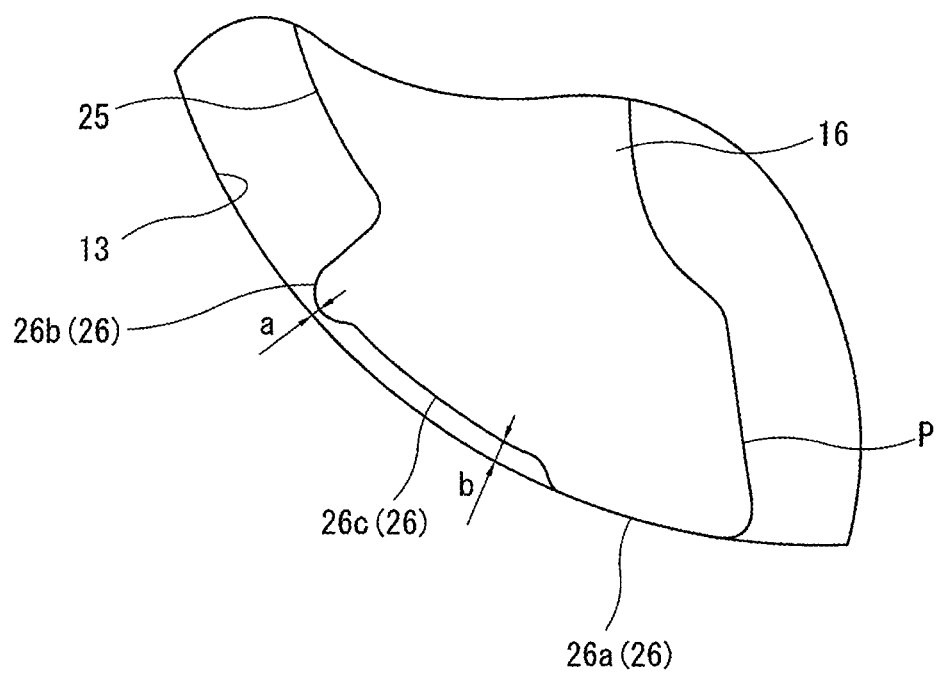
FIG. 8 is an enlarged view of a region indicated by Q in FIG. 7.

FIG. 8 shows an enlarged view of a region indicated by Q in FIG. 7. As shown in FIG. 8, the braking and locking surface 26 of the outer peripheral surface of each lock plate 16 includes a larger-diameter braking surface 26a, a braking protrusion 26b, and a recess 26c. The larger-diameter braking surface 26a has a diameter that becomes slightly shorter as being closer to the surface P, and is in contact with the braking surface 13 of the housing 11 by a longer distance in the circumferential direction. The braking protrusion 26b has a small circular arc shape, and is adjacent to the recess 25. The recess 26c separates the larger-diameter braking surface 26a and the braking protrusion 26b from each other. The braking and locking surface 26 of each lock plate 14 is the same as the braking and locking surface 26 of the lock plate 16.

As shown in FIG. 8, under a normal condition where the larger-diameter braking surface 26a of each lock plate 16 is in contact with the braking surface 13 of the housing 11, each lock plate 16 satisfies a mathematical expression of a<b, wherein a represents a clearance between the braking protrusion 26b and the braking surface 13, and b represents a depth of the recess 26c with respect to the braking surface 13, wherein the braking protrusion 26b is out of contact with the braking surface 13.

Figure 9:
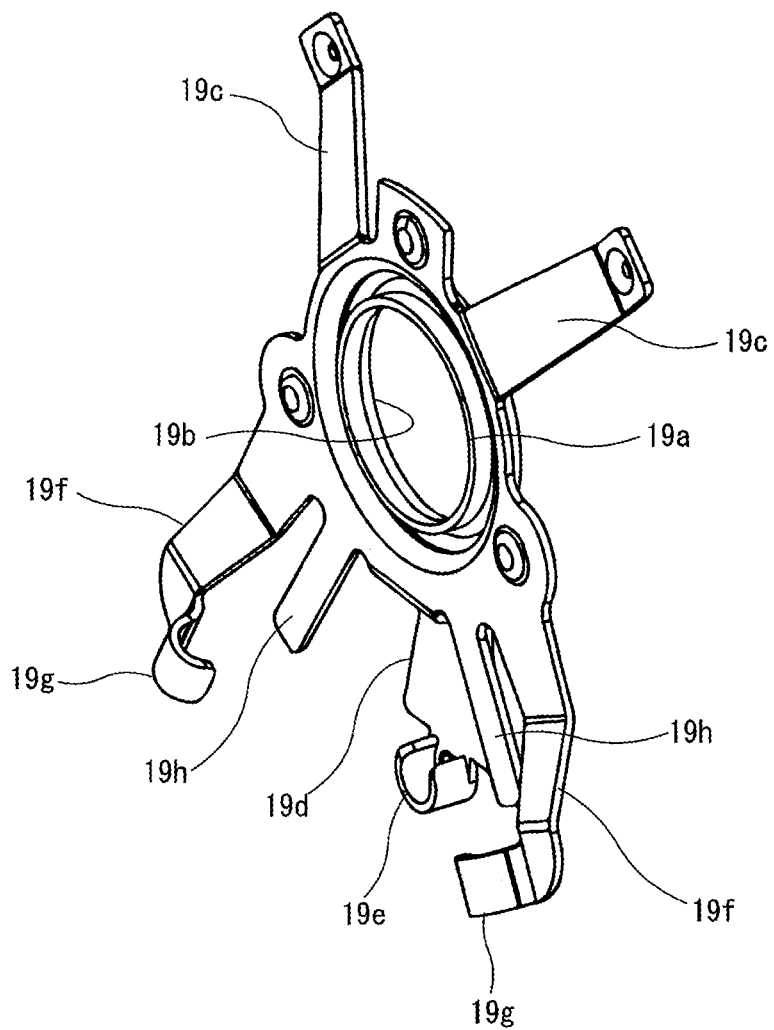
FIG. 9 is an enlarged view of a holder plate shown in FIG. 6.
Figure 14:
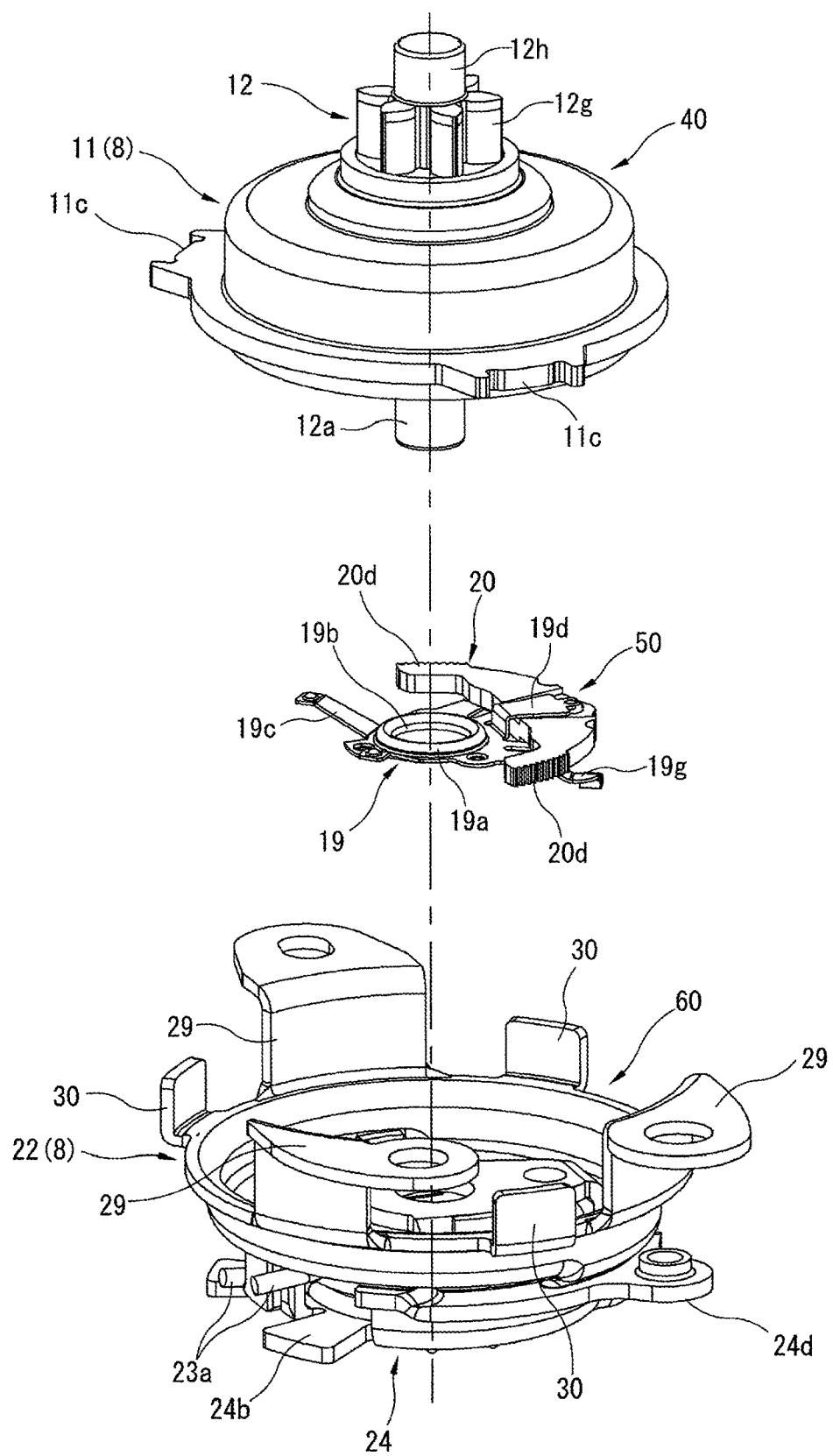
FIG. 14 is an exploded perspective view of the brake device, showing a state where the components of the braking section and the components of the operating section are preliminarily assembled separately as a brake assembly, a tooth assembly, and a lever assembly.

As shown in FIGS. 6 and 9, the holder plate 19 of the operating section 10 has a kind of leaf spring serving as a spring in the axial direction of the pinion shaft 12. The holder plate 19 includes a boss 19a, a pair of legs 19c, and an arm 19d. The boss 19a includes a shaft hole 19b in which the intermediate-diameter shaft part 12b of the pinion shaft 12 is inserted. Each leg 19c extends radially outwardly from the boss 19a, and is formed integrally with the boss 19a by bending toward the drive wheel 18 and seated on the bottom part of the drive wheel 18. The arm 19d also extends radially outwardly from the boss 19a, and is formed integrally with the boss 19a by bending to have a stepped shape as shown in FIG. 14. The arm 19d includes a first shaft part 19e that is formed by cutting and raising a tip portion of the arm 19d to have a substantially cylindrical shape. The first shaft part 19e serves as a first support part.

As shown in FIGS. 6 and 9, the holder plate 19 further includes a pair of acting parts 19f closer to the arm 19d, wherein each acting part 19f is formed by bending toward the cover 22, and extends radially outwardly from the boss 19a without interference with the arm 19d. Each acting part 19f includes an engaging portion 19g that is formed by curving the tip portion of the acting part 19f. The holder plate 19 further includes a pair of holding parts 19h inside the pair of acting parts 19f, wherein each holding part 19h extends straight radially from the boss 19a, wherein the arm 19d is interposed between the pair of holding parts 19h as viewed in the axial direction.

As shown in FIG. 6, the tooth plate 20 has a substantially semicircular shape, and is placed over the arm 19d of the holder plate 19 in the recess of the drive wheel 18. The tooth plate 20 includes a shaft part 20a at its central position, wherein the shaft part 20a has a variant shape and projects toward the cover 22. The tooth plate 20 further includes a shaft hole 20b that has a circular shape, and is offset from the shaft part 20a outwardly in the radial direction of the pinion shaft 12. The tooth plate 20 includes a pair of rims 20c at its ends, wherein each rim 20c faces the internal teeth 18b of the drive wheel 18. Each rim 20c includes external teeth 20d in its outer peripheral surface, wherein the external teeth 20d engage with the internal teeth 18b of the drive wheel 18.

The external teeth 20d has a substantially D-shape that is formed by cutout of a part from a circular shape, in this example. This serves to avoid interference with the adjacent shaft hole 20b. Accordingly, the shaft part 20a may be formed to have a substantially cylindrical shape, if there is no such interference.

As shown in FIG. 6, the input lever 21 is an input member of the operating section 10, including a shaft hole 21a at its central portion through which the input lever 21 is rotatably supported by the intermediate-diameter shaft part 12b of the pinion shaft 12. The input lever 21 includes a smaller-diameter shaft hole 21b that is offset outwardly from the shaft hole 21a, and serves as a second support part in which the shaft part 20a of the tooth plate 20 is inserted. The input lever 21 includes three bended engagement parts 21c at its outer periphery, wherein each bended engagement part 21c projects toward the cover 22 and has a pair of branched end portions.

The shaft part 20a of the tooth plate 20 is rotatably inserted and supported in the smaller-diameter shaft hole 21b of the input lever 21. In this way, the input lever 21 and the tooth plate 20 are rotatably coupled to each other. The shaft hole 20b of the tooth plate 20 is engaged with the first shaft part 19e of the holder plate 19 such that the tooth plate 20 and the holder plate 19 are rotatably coupled to each other. As shown in FIG. 14, the tooth plate 20 is inserted between the arm 19d and the holding parts 19h of the holder plate 19. The combination of the shaft hole 20b of the tooth plate 20 and the first shaft part 19e of the holder plate 19 may be replaced with a combination of a shaft part of the tooth plate 20 and a shaft hole of the holder plate 19.

As shown in FIG. 6, the cover 22 is integrally formed by deep drawing by stamping to have a cup-shape. As shown in FIGS. 2 and 5, the cover 22 is coupled with the housing 11 of the braking section 9 such that the cover 22 and the housing 11 form the case 8 of the brake device 7. As described above, the components of the braking section 9 and the operating section 10 are mounted in the case 8.

As shown in FIG. 5, the holder plate 19 is elastically compressed between the drive wheel 18 and the input lever 21 to bring the holder plate 19 into pressing contact with the drive wheel 18 and the input lever 21. Furthermore, the end portions of the legs 19c of the holder plate 19 are put in pressing contact with a resin-molded portion of the bottom wall of the drive wheel 18, thereby producing a resistance in the rotational direction against slide between the holder plate 19 and the drive wheel 18.

As shown in FIG. 4, the cover 22 includes a wall part that includes a shaft hole 22a in its central portion, and a pair of slots 22b opposite to each other with respect to the shaft hole 22a, wherein each slot 22b has a circular arc shape. In a direction perpendicular to the direction of arrangement of the slots 22b, an opening 22c and an opening 22d are arranged opposite to each other with respect to the shaft hole 22a. The opening 22c is a slot having a circular arc shape. The opening 22d has a rectangular shape, and is formed with a cut and raised part 22e radially outside of the opening 22d, wherein the cut and raised part 22e stands perpendicularly outwardly. The opening 22c has a greater length along its arc shape than the slots 22b. When the cover 22 is coupled with the housing 11 of the braking section 9, the shaft hole 22a of the cover 22 is fitted with the smaller-diameter shaft part 12a of the pinion shaft 12 such that the pinion shaft 12 is rotatably supported at two end points by the housing 11 and the cover 22.

As shown in FIG. 4, the three bended engagement parts 21c of the input lever 21 are inserted through corresponding ones of the two slots 22b and the opening 22c, projecting toward the lever bracket 24. The length of each slot 22b and the length of the opening 22c in the circumferential direction are set greater sufficiently than the width of each bended engagement part 21c. The range of rotation of the input lever 21 rotatable in the normal rotational direction and in the reverse rotational direction is restricted by the length of each slot 22b. Accordingly, the range of rotation of the lever bracket 24, which is coupled to the input lever 21, is also restricted by the length of each slot 22b. Namely, the inner peripheral surface of each longitudinal end of each slot 22b serves as a stopper to restrict the range of rotation of the lever bracket 24.

As shown in FIG. 4, as the input lever 21 is in its neutral position, the engaging portion 19g of each acting part 19f of the holder plate 19 is engaged detachably with the corresponding longitudinal end of the opening 22c of the cover 22. Accordingly, the holder plate 19 is made to rotate together with the input lever 21 via the tooth plate 20, and when the input lever 21 is returned to the neutral position, the holder plate 19 is also returned to the neutral position.

Figure 11:
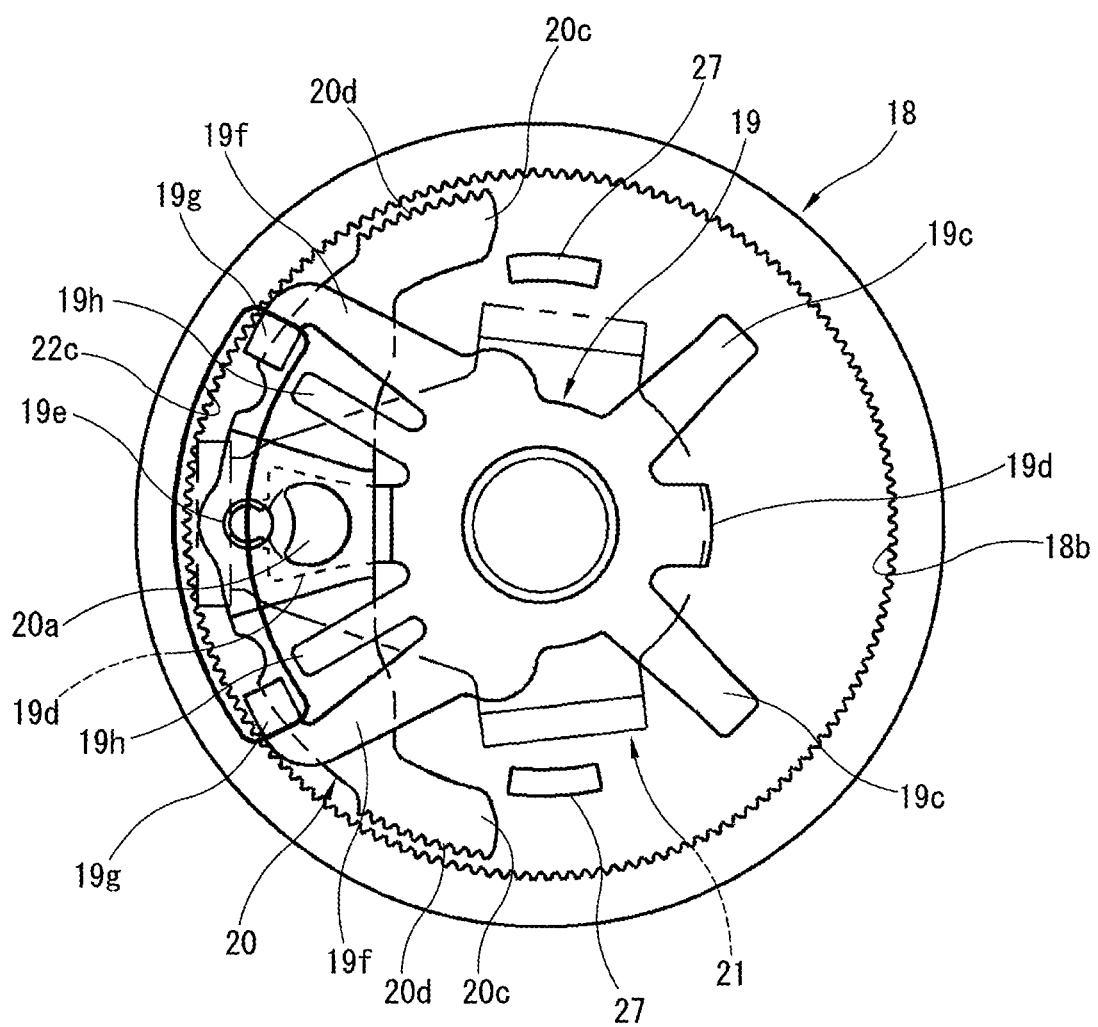
FIG. 11 is an illustrative view of the operating section shown in FIG. 6 when in its neutral state.

As shown in FIG. 4, each slot 22b is provided with a guide protrusion 27 at its peripheral part, which is formed by bending to project inwardly. As shown in FIGS. 5 and 11, each guide protrusion 27 faces the internal space of the braking section 9, and serves to guide movement of the tooth plate 20 as detailed below.

As shown in FIGS. 4 and 6, the cover 22 includes three flanges 29 at its outer periphery, wherein the flanges 29 are formed by bending radially outwardly to face the housing 11, and arranged in the circumferential direction, wherein each flange 29 includes a mounting hole 29a. The cover 22 further includes three flange engagement projections 30 without interference with the flanges 29, wherein each flange engagement projection 30 projects less than the flanges 29. As shown in FIG. 2, each flange engagement projection 30 is fitted in the corresponding engagement recess 11c of the housing 11, when the cover 22 is coupled with the housing 11 to form the case 8. Furthermore, each flange engagement projection 30 is swaged from a state indicated by an imaginary line in FIG. 2 to a state indicated by a solid line in FIG. 2, to fix the cover 22 and the housing 11 together while preventing the cover 22 and the housing 11 from being detached from each other. The flanges 29 of the cover 22 are employed to mount the brake device 7 to the seat 1 shown in FIG. 1.

As shown in FIGS. 6 and 5, the lever bracket 24 is formed by drawing press to have a pan-like shape, and is arranged outside the side wall part of the cover 22. Between the cover 22 and the lever bracket 24, the coil spring 23 is disposed in a recess of the lever bracket 24. The lever bracket 24 includes a shaft hole 24a at its central portion. The lever bracket 24 is rotatably supported by the pinion shaft 12 by insertion of the smaller-diameter shaft part 12a of the pinion shaft 12 in the shaft hole 24a of the lever bracket 24. As shown in FIG. 3, the lever bracket 24 has a pair of positioning parts 24b and a cut and raised part 24c at its outer periphery, wherein the cut and raised part 24c is disposed between the positioning parts 24b, and projects toward the cover 22.

As shown in FIGS. 6 and 3, the lever bracket 24 includes a pair of flanges 24d and three rectangular holes 24f, wherein each flange 24d includes a screw hole 24e, and wherein each rectangular hole 24f corresponds to one of the three bended engagement parts 21c of the input lever 21. Each bended engagement part 21c of the input lever 21 extends through a corresponding one of the slots 22b and the opening 22c of the cover 22, and engages with and projects through the corresponding rectangular hole 24f of the lever bracket 24.

As shown in FIG. 3, a pair of tip branched portions 121c of each bended engagement part 21c of the input lever 21 projecting through the rectangular hole 24f of the lever bracket 24 are bended away from each other to fix the lever bracket 24 and the input lever 21 to each other while the cover 22 is disposed therebetween. This prevents relative rotation between the lever bracket 24 and the input lever 21, and allows the lever bracket 24 and the input lever 21 to rotate as a solid unit in the normal rotational direction or in the reverse rotational direction.

The cut and raised part 24c of the lever bracket 24 corresponds in position to the cut and raised part 22e of the cover 22. Accordingly, as shown in FIGS. 3 and 4, when the lever bracket 24 is fixed to the input lever 21, the cut and raised part 24c of the lever bracket 24 is inserted in the opening 22d of the cover 22, so that the cut and raised part 22e overlaps with the cut and raised part 24c.

The operation lever 5 shown in FIG. 1 is attached to the lever bracket 24 shown in FIGS. 3 and 6. The operation lever 5 is positioned with respect to the lever bracket 24 by the pair of positioning parts 24b, and is then fixed to the lever bracket 24 by putting fastening screws not shown into the two screw holes 24e. By this configuration, the operation lever 5 and the lever bracket 24 serve as an operation member in the operating section 10.

As shown in FIG. 6, the coil spring 23 is mounted between the cover 22 and the lever bracket 24, to bias the input lever 21 and the lever bracket 24 toward the neutral position and hold them in the neutral position. The coil spring 23 includes hook portions 23a at its ends, wherein each hook portion 23a is formed by bending radially outwardly. As shown also in FIG. 3, the coil spring 23 is set in tightened state, and the pair of hook portions 23a are made to sandwich and engage with the cut and raised part 22e of the cover 22 and the cut and raised part 24c of the lever bracket 24 that overlap with each other, in the rotational direction.

Accordingly, when the operation lever 5 shown in FIG. 1 is rotated in the normal rotational direction or in the reverse rotational direction, and then an effort of operating the operation lever 5 is released, the biasing force of the coil spring 23 causes the input lever 21 and the lever bracket 24 and the operation lever 5 to return to the neutral position.

The pinion shaft 12, the lock plates 14, 16, and the ring part 18a of the drive wheel 18, the tooth plate 20, etc. are made of metal. These components are hardened by quenching before assembling, in consideration of requirements of each component. On the other hand, the housing 11 is also made of metal, but preferably, is made to undergo no quenching process. This serves to allow the larger-diameter braking surface 26a and the braking protrusion 26b of each lock plate 14, 16 to suitably bite the braking surface 13 of the housing 11, while ensuring a resistance against slide between each lock plate 14, 16 and the braking surface 13, as detailed below.

Figure 10:
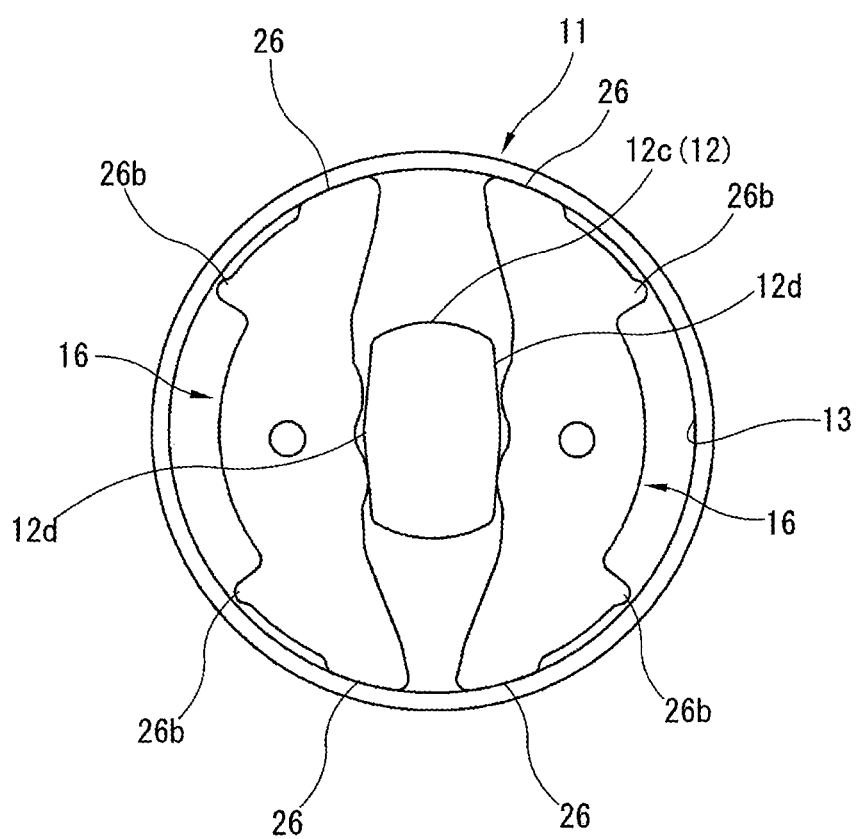
FIG. 10 is an illustrative schematic view of the braking section shown in FIG. 7.

The brake device 7 described above operates and produces advantageous effects as follows. When the operation lever 5 and also the lever bracket 24 are free from rotating operation, the lever bracket 24 and the input lever 21 are maintained in the neutral state by the biasing force of the coil spring 23. FIG. 10 schematically shows the braking section 9 shown in FIG. 7 in the neutral state. FIG. 11 shows the operating section 10 shown in FIG. 6 in the neutral state.

When in the neutral state shown in FIGS. 10 and 11, the tooth plate 20 of the operating section 10 is in the neutral position, and the external teeth 20d of each end of the tooth plate 20 are out of meshing contact with the internal teeth 18b of the drive wheel 18 with a clearance. Simultaneously, in the braking section 9, the protrusions 16a, 16b of the lock plates 14, 16 are pressed on the flat portion 12d of the pinion shaft 12 under the biasing forces of the lock springs 15, 17, and the braking and locking surface 26 of each end of each lock plate 14, 16 is pressed on the braking surface 13 of the housing 11. This prevents rotation of the pinion shaft 12 in the normal rotational direction and in the reverse rotational direction, and frictionally holds the brake device 7 in the braked state.

Under this condition, the brake device 7 is self-held in the braked state by the frictional force between the braking surface 13 of the housing 11 and the braking and locking surface 26 of each lock plate 14, 16, even when an inverse input acts on the brake device 7 from the seat lifter mechanism due to seating of a passenger. When an excessive external force is inputted inversely through the pinion shaft 12, this force is resisted by the frictional force of the larger-diameter braking surface 26a of the braking and locking surface 26, and also by biting of the braking protrusion 26b of the braking and locking surface 26 into the braking surface 13. In this way, in the braking section 9, the braking surface 13 of the housing 11, and the lock plates 14, 16 with the lock springs 15, 17 serve a direct braking function.

For adjustment of the height position by the seat lifter mechanism, the braking section 9 of the brake device 7 is released from the braked state by rotating operation of the lever bracket 24 of the operating section 10 with the operation lever 5 in the normal rotational direction or in the reverse rotational direction.

In the state shown in FIG. 11, the external teeth 20d of each end of the tooth plate 20 face the internal teeth 18b of the drive wheel 18, but are out of meshing-contact with the internal teeth 18b with a clearance. Each rim 20c of the tooth plate 20, in which the external teeth 20d are formed, is out of contact with the guide protrusion 27 projecting from the cover 22.

Figure 12:
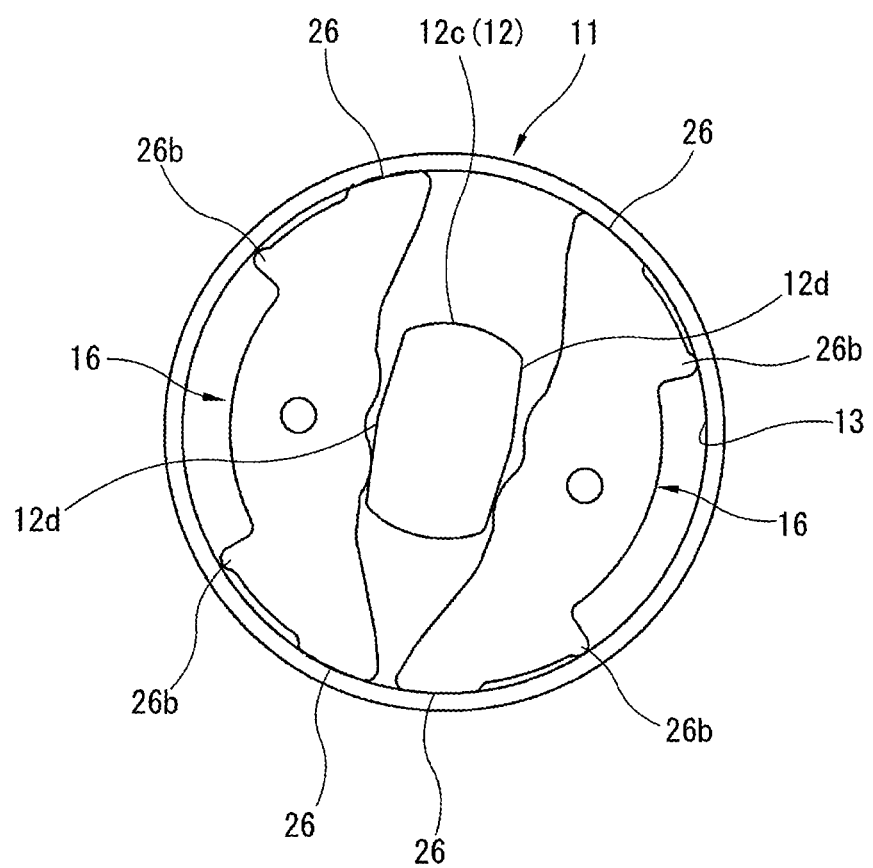
FIG. 12 is an illustrative schematic view of the braking section when an operation lever is rotated from the neutral state shown in FIG. 10.
Figure 13:
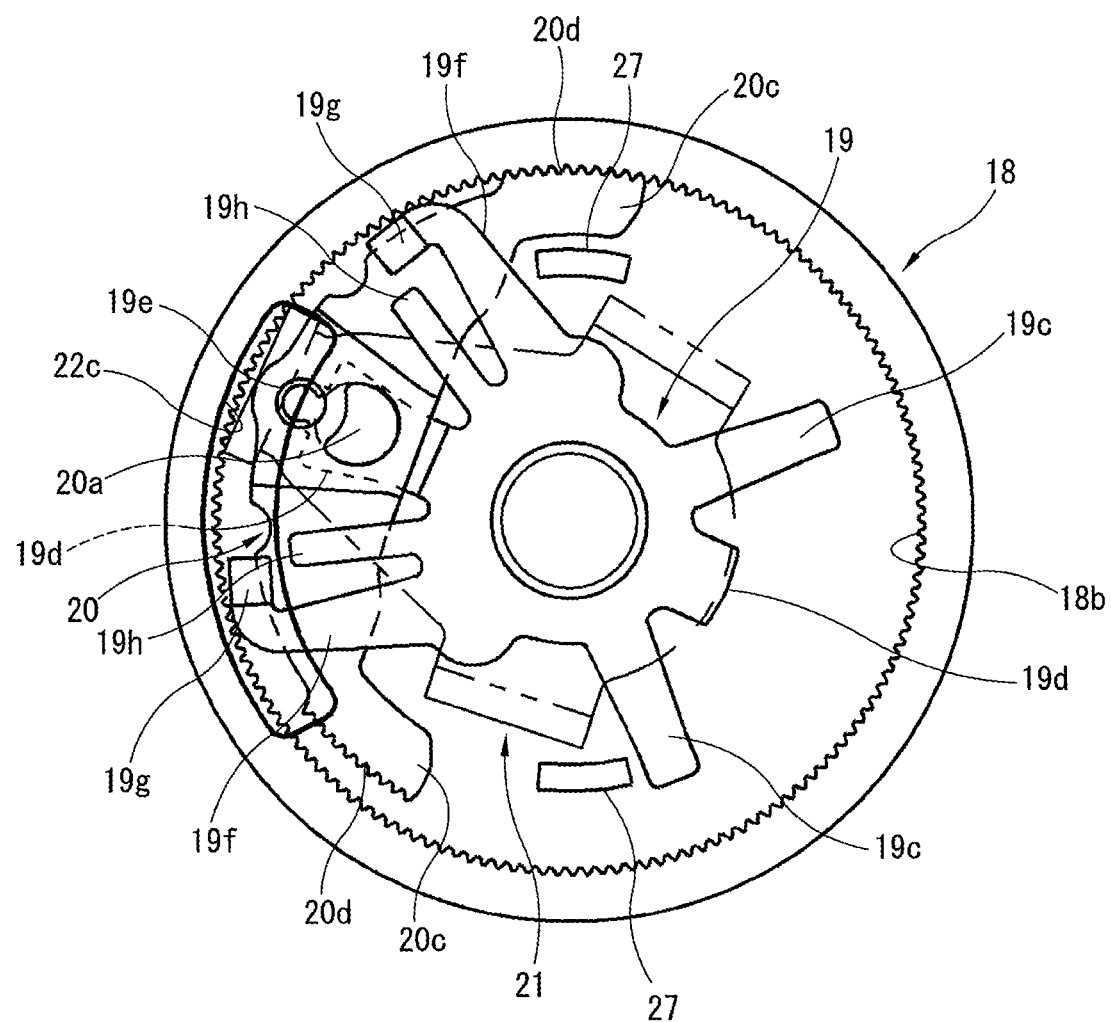
FIG. 13 is an illustrative view of the operating section when the operation lever is rotated from the neutral state shown in FIG. 11.

The following deals with a situation that the operation lever 5 and the lever bracket 24 are rotated in the normal rotational direction or in the reverse rotational direction from the neutral state of the operating section 10 shown in FIG. 11. FIGS. 12 and 13 respectively show the braking section 9 and the operating section 10 when the operation lever 5 and also the lever bracket 24 are rotated in the clockwise direction from the neutral state shown in FIGS. 10 and 11. As shown in FIG. 13, as the lever bracket 24 rotates in the clockwise direction, the input lever 21 of the operating section 10 rotates in the same direction integrally with the lever bracket 24. Furthermore, this rotation of the input lever 21 pushes the tooth plate 20 in the clockwise direction because of the fitting between the shaft part 20a of the tooth plate 20 and the smaller-diameter shaft hole 21b of the input lever 21.

The tooth plate 20 is supported at the shaft hole 20b by the first shaft part 19e of the holder plate 19, whereas the holder plate 19 is pressed on the inner bottom surface of the drive wheel 18, and is thereby subject to a rotational resistance against the clockwise rotation of the drive wheel 18. Accordingly, when the shaft part 20a of the tooth plate 20 is pushed by the input lever 21, the tooth plate 20 rotates about the first shaft part 19e of the holder plate 19 in the counterclockwise direction in FIG. 13. As a result, as shown in FIG. 13, the external teeth 20d of the upper one of the rims 20c of the tooth plate 20 are brought into meshing contact with the internal teeth 18b of the drive wheel 18. As the input lever 21 is thereafter rotated more in the clockwise direction in FIG. 13, the input lever 21, the tooth plate 20, the holder plate 19, and the drive wheel 18 rotate as a solid unit.

As shown in FIG. 13, when in the state that the input lever 21 is rotated from the neutral position, the upper rim 20c of the tooth plate 20 is positioned to face the upper one of the guide protrusions 27 of the cover 22. This causes interference between the upper rim 20c of the tooth plate 20 and the upper guide protrusion 27, and thereby prevents the lower external teeth 20d of the tooth plate 20 from meshing with the internal teeth 18b of the drive wheel 18. Accordingly, when the input lever 21 returns from the position shown in FIG. 13 to the neutral position, the input lever 21, the tooth plate 20, and the holder plate 19 rotate as a solid unit to the neutral state, with the lower external teeth 20d being out of meshing contact with the internal teeth 18b of the drive wheel 18.

As shown in FIG. 4, two of the three bended engagement parts 21c of the input lever 21, which rotate along with the operation lever 5, are inserted through the corresponding slots 22b of the cover 22. Accordingly, the stroke of the operation lever 5 is restricted by contact between each bended engagement part 21c and one of the longitudinal ends of the corresponding slot 22b.

As shown in FIG. 13, the drive wheel 18 is pushed by meshing contact with the tooth plate 20, and thereby releases the restriction of rotation of the pinion shaft 12 by the lock plates 14, 16. As shown in FIG. 7, each release nail 18d of the drive wheel 18 is inserted in the recess 25 of the corresponding lock plates 14, 16. The release nails 18d are shown in FIG. 7, but are omitted in FIGS. 10 and 12.

As the drive wheel 18 rotates in the clockwise direction as shown in FIG. 13, each release nail 18d of the drive wheel 18 rotates the corresponding lock plates 14, 16 in the clockwise direction. As shown in FIG. 12, the sandwiching of the flat portion 12d of the pinion shaft 12 by the lock plates 14, 16 is released, to substantially release the braking section 9 from the braked state. This allows the pinion shaft 12 to rotate with respect to the lock plates 14, 16 and also with respect to the housing 11.

As the drive wheel 18 is pushed by the tooth plate 20 to rotate, the pinion shaft 12 starts to rotate after the drive wheel 18 has rotated by the preset play between the rectangular hole 18c of the drive wheel 18 and the flat portion 12d of the variant shaft part 12c of the pinion shaft 12. The contact between the rectangular hole 18c and the flat portion 12d of the variant shaft part 12c allows the pinion shaft 12 to rotate in the clockwise direction in FIG. 12. This rotation of the pinion shaft 12 causes rotation of the pinion gear 12g naturally, and thereby causes rotation of the driven gear of the seat lifter mechanism that meshes with the pinion gear 12g, and thereby causes a downward displacement of the seat 1 in this example.

With respect to the amount of rotation of the operation lever 5, the vertical displacement of the seat 1 by the seat lifter mechanism is small. Accordingly, in many situations, a desired vertical displacement of the seat 1 is achieved by a plurality of operations of the operation lever 5.

The operation lever 5 shown in FIG. 1, which is attached to the lever bracket 24 shown in FIG. 6, receives a restoring force of the coil spring 23 shown in FIG. 6 via the lever bracket 24. Accordingly, when the force of operation of the operation lever 5 is released, the restoring force of the coil spring 23 causes the operation lever 5, and the input lever 21, the holder plate 19, and the tooth plate 20 of the operating section 10 to return from the state shown in FIG. 13 to the neutral state shown in FIG. 11.

For the return to the neutral state, as the input lever 21 is rotated in the counterclockwise direction from the state shown in FIG. 13 toward the neutral position, the tooth plate 20 rotates in the clockwise direction about the first shaft part 19e of the holder plate 19. This rotation of the tooth plate 20 brings the upper external teeth 20d out of meshing contact with the internal teeth 18b of the drive wheel 18, whereas allowing the lower external teeth 20d to move toward meshing contact with the internal teeth 18b.

However, the upper guide protrusion 27 of the cover 22 prevents the upper rim 20c of the tooth plate 20 from rotating further from the neutral position. This thereby prevents the lower external teeth 20d of the tooth plate 20 from meshing with the internal teeth 18b of the drive wheel 18. Accordingly, while the drive wheel 18 remains in the position to which the drive wheel 18 has been rotated previously, the input lever 21, the tooth plate 20, and the holder plate 19 rotate and return to the neutral position shown in FIG. 11 without rotation of the drive wheel 18 and the pinion shaft 12. As the tooth plate 20 returns to the neutral position as shown in FIG. 11, the upper rim 20c of the tooth plate 20 is released from restriction of the corresponding guide protrusion 27 of the cover 22 such that both of the upper external teeth 20d and the lower external teeth 20d are brought into the positions capable of meshing with the internal teeth 18b of the drive wheel 18.

As is clear from comparison between FIG. 11 and FIG. 13, when the holder plate 19 is rotated in the clockwise direction as shown in FIG. 13, the holding part 19h at the tip of the acting part 19f gets out of the opening 22c of the cover 22 temporarily. On the other hand, when the holder plate 19 is returned to the neutral position as shown in FIG. 11, the holding part 19h at the tip of the acting part 19f also returns to the initial state and engages again with the opening 22c of the cover 22.

As is clear from FIGS. 10 and 11, each of the braking section 9 and the operating section 10 has an internal structure symmetric with respect to a line such as a vertical line or horizontal line. Accordingly, the behavior of the brake device 7 described above is true for the situation where the operation lever 5 is rotated in the opposite direction (in the counterclockwise direction in FIGS. 10 and 11), except for the direction of rotation of the components of the operating section 10 and the braking section 9.

The following describes a process of assembling the brake device 7 described above. First, the components of the braking section 9 and the components of the operating section 10 are separated in three groups, and preliminarily assembled as a brake assembly 40, a tooth assembly 50, and a lever assembly 60. Second, the assemblies 40, 50, and 60 are arranged and assembled together in the axial direction.

As shown in FIG. 14, the brake assembly 40 is a combination of the components of the braking section 9. Namely, the pinion shaft 12, the pair of lock plates 14 with the lock spring 15, the pair of lock plates 16 with the lock spring 17, and the drive wheel 18 are arranged in the axial direction and preliminarily assembled to the housing 11 as a base member, thereby forming the brake assembly 40.

With regard to the assembling of the brake assembly 40, the elastic force of the lock spring 15 disposed between the lock plates 14 and the elastic force of the lock spring 17 disposed between the lock plates 16 serve to maintain the braking and locking surfaces 26 of the lock plates 14, 16 in pressing contact with the braking surface 13 (inner peripheral surface) of the housing 11.

The drive wheel 18 is in pressing contact with the braking surface 13 of the housing 11 by the elastic force of the release nails 18d of the drive wheel 18, as described above. Therefore, the brake assembly 40 is self-held in an assembled state shown in FIG. 14 in which the housing 11, the pinion shaft 12, the pair of lock plates 14, the pair of lock plates 16, and the drive wheel 18 are maintained in the same positional relationship as in a finally assembled state of the brake device 7.

As shown in FIG. 14, the tooth assembly 50 is a combination of the holder plate 19 and the tooth plate 20 of the operating section 10. The tooth plate 20 is sandwiched between the arm 19d and the pair of holding parts 19h of the holder plate 19. Furthermore, the shaft hole 20b of the tooth plate 20 is fitted with the first shaft part 19e of the arm 19d of the holder plate 19.

With regard to the assembling of the tooth assembly 50, the clearance between the arm 19d and the pair of holding parts 19h in the axial direction is set capable of receiving the thickness of the tooth plate 20, so that the combination of the setting that the tooth plate 20 is sandwiched between the arm 19d and the pair of holding parts 19h of the holder plate 19, and the setting that the shaft hole 20b of the tooth plate 20 is fitted with the first shaft part 19e of the arm 19d of the holder plate 19, serves to prevent the holder plate 19 and the tooth plate 20 from being detached from each other. Therefore, the tooth assembly 50 is self-held in an assembled state shown in FIG. 14 in which the holder plate 19 and the tooth plate 20 are maintained in the same positional relationship as in the finally assembled state of the brake device 7.

As shown in FIG. 14, the lever assembly 60 is a combination of the input lever 21, the cover 22, the coil spring 23, and the lever bracket 24 of the operating section 10. The input lever 21 is attached to the inside of the cover 22, and the bended engagement parts 21c of the input lever 21 are inserted through the slots 22b and the opening 22c, and the coil spring 23 is made to abut the outside of the cover 22, and the three bended engagement parts 21c projecting from the cover 22 are surrounded by the coil spring 23. Moreover, the hook parts 23a of the coil spring 23 are made to engage with both sides of the cut and raised part 22e of the cover 22.

Furthermore, the lever bracket 24 is placed on the cover 22, covering the coil spring 23. The cut and raised part 24c of the lever bracket 24 is made to overlap with the cut and raised part 22e of the cover 22, and the hook parts 23a of the coil spring 23 are made to engage also with the cut and raised part 24c of the lever bracket 24. Simultaneously, the bended engagement parts 21c projecting from the cover 22 are made to project also from the lever bracket 24 through the rectangular holes 24f.

Under this condition, the input lever 21, the cover 22, the coil spring 23, and the lever bracket 24 are brought into a non-preliminarily assembled state by bending each bended engagement part 21c projecting from the rectangular hole 24f of the lever bracket 24, specifically, bending plastically the tip branched portions 121c of each bended engagement part 21c of the input lever 21 away from each other. Therefore, the lever assembly 60 is self-held in an assembled state shown in FIG. 14 in which the input lever 21, the cover 22, the coil spring 23, and the lever bracket 24 are maintained in the same positional relationship as in the finally assembled state of the brake device 7.

As shown in FIG. 14, after individual preliminary assembling of the brake assembly 40, the tooth assembly 50, and the lever assembly 60, the lever assembly 60 is placed with the inside of the cover 22 directed upward, and the tooth assembly 50 is placed on the lever assembly 60, and the brake assembly 40 is finally placed over the tooth assembly 50.

When the tooth assembly 50 is placed on the lever assembly 60, the shaft part 20a of the tooth plate 20 is fitted in the smaller-diameter shaft hole 21b of the input lever 21.

When the brake assembly 40 is placed over the tooth assembly 50, the pinion shaft 12 is inserted through the shaft hole 19b of the holder plate 19, and through the shaft hole 21a of the input lever 21, and through the shaft hole 22a of the cover 22, and through the shaft hole 24a of the lever bracket 24. Then, the three flange engagement projections 30 of the cover 22 are fitted with the corresponding three engagement recesses 11c of the housing 11.

Under the condition that the brake assembly 40, the tooth assembly 50, and the lever assembly 60 are assembled together, the flange engagement projections 30 of the cover 22 are swaged as shown in FIG. 2, to couple the assemblies undetachably, and finish the brake device 7.

According to the present disclosure, it is possible to enhance the assembling facility, and reduce the workload of assembling, and thereby reduce the manufacturing cost. This may be easily applied to an automatic assembling process performed by an assembling robot.

The braking section 9 may be of another type that rollers held in a holder are interposed between inner and outer wheels as disclosed in Japanese Patent No. 3977065.

In summary, a brake device (7) for a motor vehicle seat (1) includes: a brake assembly (40) including a housing (11), a pinion shaft (12), a braking component (lock plates 14, lock spring 15, lock plates 16, lock spring 17), and a drive wheel (18) that are structured to be self-held in an assembled state by mechanical interaction thereamong; a tooth assembly (50) including a holder plate (19) and a tooth plate (20) that are structured to be self-held in an assembled state by mechanical interaction therebetween; and a lever assembly (60) including an input lever (21), a cover (22), a coil spring (23), and a lever bracket (24) that are structured to be self-held in an assembled state by mechanical interaction thereamong, wherein the brake assembly (40), the tooth assembly (50), and the lever assembly (60) are arranged and assembled together in an axial direction; wherein: the brake assembly (40) is structured as a braking section (9) to resist an external torque inputted through the pinion shaft (12); the tooth assembly (50) and the lever assembly (60) are structured as an operating section (10) to operate the pinion shaft (12); the pinion shaft (12) extends through the drive wheel (18), the holder plate (19), and the input lever (21), and is supported rotatably with respect to the holder plate (19) and the input lever (21); the braking component (14, 15, 16, 17) and the drive wheel (18) are mounted in the housing (11); the drive wheel (18) is structured to rotate along with the pinion shaft (12), and includes an internal tooth part (18b); the holder plate (19) is structured to frictionally resist rotation of the drive wheel (18), and includes a first support part (first shaft part 19e); the tooth plate (20) is rotatably supported by the first support part (19e) of the holder plate (19), and includes a pair of external tooth parts (20d) each of which is structured to engage with the internal tooth part (18b) of the drive wheel (18); the input lever (21) includes a second support part (smaller-diameter shaft hole 21b) structured to engage with the tooth plate (20), wherein the second support part (smaller-diameter shaft hole 21b) is offset from the first support part (first shaft part 19e) of the holder plate (19); the cover (22) is coupled with the housing (11) to contain the holder plate (19), the tooth plate (20), and the input lever (21); the coil spring (23) is structured to bias the input lever (21) toward a neutral position; and the lever bracket (24) is disposed outside the cover (22), and coupled with the input lever (21). The holder plate (19) includes a holding part (19h) structured to prevent the tooth plate (20) from being released from the first support part (first shaft part 19e). The holder plate (19) is implemented by a leaf spring; the holder plate (19) includes: a pair of the holding parts (19h) extending along a first surface of the tooth plate (20) facing the input lever (21); and an arm (19d) extending along a second surface of the tooth plate (20) opposite to the first second surface; and the tooth plate (20) is interposed and supported between the arm (19d) and the pair of holding parts (19h). The holder plate (19) includes: a pair of legs (19c) structured to be pressed onto the drive wheel (18); and a pair of acting parts (19f) structured to engage with the cover (22); and the holder plate (19) is structured to be held in a neutral position by the pair of acting parts (19f) when the input lever (21) is in the neutral position. The coil spring (23) is interposed between the cover (22) and the lever bracket (24), and mounted in a recess of the lever bracket (24); the coil spring (23) includes a pair of ends (23a) engaged with a cut and raised part (22e) of the cover (22) and a cut and raised part (24c) of the lever bracket (24); and the cut and raised part (22e) of the cover (22) overlaps with the cut and raised part (24c) of the lever bracket (24) when the lever bracket (24) is in a neutral position.

The entire contents of Japanese Patent Application 2018-172035 filed Sep. 14, 2018 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A brake device for a motor vehicle seat, comprising:
a brake assembly including a housing, a pinion shaft, a braking component, and a drive wheel that are self-held in an assembled state by mechanical interaction thereamong;
a tooth assembly including a holder plate and a tooth plate that are self-held in an assembled state by mechanical interaction therebetween; and
a lever assembly including an input lever, a cover, a coil spring, and a lever bracket that are self-held in an assembled state by mechanical interaction thereamong, wherein the brake assembly, the tooth assembly, and the lever assembly are arranged and assembled together in an axial direction;
wherein:
the brake assembly resists an external torque inputted through the pinion shaft;
the tooth assembly and the lever assembly operate the pinion shaft;
the pinion shaft extends through the drive wheel, the holder plate, and the input lever, and is supported rotatably with respect to the holder plate and the input lever;
the braking component and the drive wheel are mounted in the housing;
the drive wheel is arranged to rotate along with the pinion shaft, and includes an internal tooth part;
the holder plate frictionally resists rotation of the drive wheel, and includes a first support part and a first holding part, the first holding part preventing the tooth plate from being released from the first support part;
the tooth plate is rotatably supported by the first support part of the holder plate, and includes a pair of external tooth parts each of which engages with the internal tooth part of the drive wheel;
the input lever includes a second support part that engages with the tooth plate, wherein the second support part is offset from the first support part of the holder plate;
the cover is coupled with the housing, thereby containing the holder plate, the tooth plate, and the input lever;
the coil spring biases the input lever toward a neutral position;
the lever bracket is disposed outside the cover, and coupled with the input lever;
the holder plate comprises a leaf spring;

the holder plate further includes:
- a second holding part that prevents the tooth plate from being released from the first support part, wherein the first and second holding parts each extend along a first surface of the tooth plate facing the input lever; and
- an arm extending along a second surface of the tooth plate opposite to the first surface; and the tooth plate is interposed and supported between the arm and the first and second holding parts.

2. The brake device as claimed in claim 1, wherein:
the holder plate further includes:
- a pair of legs that press onto the drive wheel; and
- a pair of acting parts that engage with the cover; and the holder plate is held in a neutral position by the pair of acting parts when the input lever is in the neutral position.

3. The brake device as claimed in claim 2, wherein:
the coil spring is interposed between the cover and the lever bracket, and mounted in a recess of the lever bracket;

the coil spring includes a pair of ends engaged with a cut and raised part of the cover and a cut and raised part of the lever bracket; and the cut and raised part of the cover overlaps with the cut and raised part of the lever bracket when the lever bracket is in the neutral position.

\* \* \* \* \*